US006857260B2

(12) United States Patent
Langenfeld et al.

(10) Patent No.: US 6,857,260 B2
(45) Date of Patent: Feb. 22, 2005

(54) THERMAL IMPROVEMENTS FOR AN EXTERNAL COMBUSTION ENGINE

(75) Inventors: Christopher C. Langenfeld, Nashua, NH (US); Michael Norris, Manchester, NH (US); Ryan Keith LaRocque, Pepperell, MA (US); Stanley B. Smith III, Raymond, NH (US); Jonathan Strimling, Bedford, NH (US)

(73) Assignee: New Power Concepts LLC, Manchester, NH (US)

(*) Notice: Subject to any disclaimer, the term of this patent is extended or adjusted under 35 U.S.C. 154(b) by 0 days.

(21) Appl. No.: 10/361,354

(22) Filed: Feb. 10, 2003

(65) Prior Publication Data

US 2003/0145590 A1 Aug. 7, 2003

Related U.S. Application Data

(62) Division of application No. 09/883,077, filed on Jun. 15, 2001, now Pat. No. 6,543,215.

(51) Int. Cl.[7] .................................................. F02C 5/00
(52) U.S. Cl. ............................ 60/39.6; 60/521; 60/522
(58) Field of Search .......................... 60/517, 520, 523, 60/524, 526, 39.6

(56) References Cited

U.S. PATENT DOCUMENTS

| | | | | | |
|---|---|---|---|---|---|
| 3,956,892 | A | * | 5/1976 | Nystrom | 60/524 |
| 4,573,320 | A | | 3/1986 | Kralick | |
| 4,662,176 | A | | 5/1987 | Fujiwara et al. | |
| 4,881,372 | A | * | 11/1989 | Naito | 60/521 |
| 4,901,790 | A | | 2/1990 | Meijer | |
| 5,459,812 | A | * | 10/1995 | Taylor | 392/498 |
| 5,755,100 | A | | 5/1998 | Lamos | |
| 6,094,912 | A | * | 8/2000 | Williford | 60/520 |
| 6,161,381 | A | * | 12/2000 | Lohrmann | 60/523 |
| 6,247,310 | B1 | * | 6/2001 | Norris et al. | 60/521 |
| 6,381,958 | B1 | | 5/2002 | Kamen et al. | |
| 6,543,215 | B2 | * | 4/2003 | Langenfeld et al. | 60/39.6 |

FOREIGN PATENT DOCUMENTS

| | | |
|---|---|---|
| GB | 675161 | 8/1945 |
| GB | 704002 | 2/1950 |
| GB | 892962 | 12/1957 |

* cited by examiner

*Primary Examiner*—Hoang Nguyen
(74) *Attorney, Agent, or Firm*—Bromberg & Sunstein LLP

(57) ABSTRACT

An external combustion engine having an exhaust flow diverter for directing the flow of an exhaust gas. The external combustion engine has a heater head having a plurality of heater tubes through which a working fluid is heated by conduction. The exhaust flow diverter is a cylinder disposed around the outside of the plurality of heater tubes and includes a plurality of openings through which the flow of exhaust gas may pas. The exhaust flow diverter directs the exhaust gas past the plurality of heater tubes. The external combustion engine may also include a plurality of flow diverter fins coupled to the plurality of heater tubes to direct the flow of the exhaust gas. The heater tubes may be U-shaped or helical coiled shaped.

10 Claims, 20 Drawing Sheets

ILLUSTRATION:DOUBLE HELIX HEATER HEAD TUBING

THERMAL IMPROVEMENTS FOR AN EXTERNAL COMBUSTION ENGINE

The present application is a divisional application of U.S. patent application Ser. No. 09/883,077, filed Jun. 15, 2001, now U.S. Pat. No. 6,543,215 which is incorporated by reference in its entirety.

TECHNICAL FIELD

The present invention pertains to components of an external combustion engine and, more particularly, to thermal improvements relating to the heater head assembly of an external combustion engine, such as a Stirling cycle engine, which contribute to increased engine operating efficiency and lifetime.

BACKGROUND OF THE INVENTION

External combustion engines, such as, for example, Stirling cycle engines, have traditionally used tube heater heads to achieve high power. FIG. 1 is a cross-sectional view of an expansion cylinder and tube heater head of an illustrative Stirling cycle engine. A typical configuration of a tube heater head 108, as shown in FIG. 1, uses a cage of U-shaped heater tubes 118 surrounding a combustion chamber 110. An expansion cylinder 102 contains a working fluid, such as, for example, helium. The working fluid is displaced by the expansion piston 104 and driven through the heater tubes 118. A burner 116 combusts a combination of fuel and air to produce hot combustion gases that are used to heat the working fluid through the heater tubes 118 by conduction. The heater tubes 118 connect a regenerator 106 with the expansion cylinder 102. The regenerator 106 may be a matrix of material having a large ratio of surface to area volume which serves to absorb heat from the working fluid or to heat the working fluid during the cycles of the engine. Heater tubes 118 provide a high surface area and a high heat transfer coefficient for the flow of the combustion gases past the heater tubes 118. However, several problems may occur with prior art tube heater head designs such as inefficient heat transfer, localized overheating of the heater tubes and cracked tubes.

As mentioned above, one type of external combustion engine is a Stirling cycle engine. Stirling cycle machines, including engines and refrigerators, have a long technological heritage, described in detail in Walker, *Stirling Engines*, Oxford University Press (1980), incorporated herein by reference. The principle underlying the Stirling cycle engine is the mechanical realization of the Stirling thermodynamic cycle: isovolumetric heating of a gas within a cylinder, isothermal expansion of the gas (during which work is performed by driving a piston), isovolumetric cooling, and isothermal compression. The Stirling cycle refrigerator is also the mechanical realization of a thermodynamic cycle that approximates the ideal Stirling thermodynamic cycle. Additional background regarding aspects of Stirling cycle machines and improvements thereto are discussed in Hargreaves, *The Phillips Stirling Engine* (Elsevier, Amsterdam, 1991).

The principle of operation of a Stirling engine is readily described with reference to FIGS. 2*a*–2*e*, wherein identical numerals are used to identify the same or similar parts. Many mechanical layouts of Stirling cycle machines are known in the art, and the particular Stirling engine designated by numeral 200 is shown merely for illustrative purposes. In FIGS. 2*a* to 2*d*, piston 202 and displacer 206 move in phased reciprocating motion within cylinders 210 that, in some embodiments of the Stirling engine, may be a single cylinder. A working fluid contained within cylinders 200 is constrained by seals from escaping around piston 202 and displacer 206. The working fluid is chosen for its thermodynamic properties, as discussed in the description below, and is typically helium at a pressure of several atmospheres. The position of displacer 206 governs whether the working fluid is in contact with hot interface 208 or cold interface 212, corresponding, respectively, to the interfaces at which heat is supplied to and extracted from the working fluid. The supply and extraction of heat is discussed in further detail below. The volume of working fluid governed by the position of the piston 202 is referred to as compression space 214.

During the first phase of the engine cycle, the starting condition of which is depicted in FIG. 2*a*, piston 202 compresses the fluid in compression space 214. The compression occurs at a substantially constant temperature because heat is extracted from the fluid to the ambient environment. The condition of engine 200 after compression is depicted in FIG. 2*b*. During the second phase of the cycle, displacer 206 moves in the direction of cold interface 212, with the working fluid displaced from the region cold interface 212 to the region of hot interface 208. The phase may be referred to as the transfer phase. At the end of the transfer phase, the fluid is at a higher pressure since the working fluid has been heated at a constant volume. The increased pressure is depicted symbolically in FIG. 2*c* by the reading of pressure gauge 204.

During the third phase (the expansion stroke) of the engine cycle, the volume of compression space 214 increases as heat is drawn in from outside engine 200, thereby converting heat to work. In practice, heat is provided to the fluid by means of a heater head 108 (shown in FIG. 1) which is discussed in greater detail in the description below. At the end of the expansion phase, compression space 214 is full of cold fluid, as depicted in FIG. 2*d*. During the fourth phase of the engine cycle, fluid is transferred from the region of hot interface 208 to the region of cold interface 212 by motion of displacer 206 in the opposing sense. At the end of this second transfer phase, the fluid fills compression space 214 and cold interface 212, as depicted in FIG. 2*a*, and is ready for a repetition of the compression phase. The Stirling cycle is depicted in a P-V (pressure-volume) diagram shown in FIG. 2*e*.

The principle of operation of a Stirling cycle refrigerator can also be described with reference to FIGS. 2*a*–2*e*, wherein identical numerals are used to identify the same or similar parts. The differences between the engine described above and a Stirling machine employed as a refrigerator are that compression volume 214 is typically in thermal communication with ambient temperature and the expansion volume is connected to an external cooling load (not shown). Refrigerator operation requires net work input.

Stirling cycle engines have not generally been used in practical applications due to several daunting challenges to their development. These involve practical considerations such as efficiency and lifetime. The instant invention addresses these considerations.

SUMMARY OF THE INVENTION

In accordance with preferred embodiments of the present invention, there is provided an external combustion engine of the type having a piston undergoing reciprocating linear motion within an expansion cylinder containing a working fluid heated by heat from an external source that is conducted through a heater head having a plurality of heater tubes. The external combustion engine has an exhaust flow diverter for directing the flow of an exhaust gas past the plurality of heater tubes. The exhaust flow diverter comprises a cylinder disposed around the outside of the plurality of heater tubes, the cylinder having a plurality of openings through which the flow of exhaust gas may pass. In one embodiment, the exhaust flow diverter directs the flow of the exhaust gas in a flow path characterized by a direction past a downstream side of each outer heater tube in the plurality of heater tubes. Each opening in the plurality of openings may be positioned in line with a heater tube in the plurality of heater tubes. At least one opening in the plurality of openings may have a width equal to the diameter of a heater tube in the plurality of heater tubes.

In another embodiment, the exhaust flow diverter further includes a set of heat transfer fins thermally connected to the exhaust flow diverter. Each heat transfer fin is placed outboard of an opening and directs the flow of the exhaust gas along the exhaust flow diverter. In another embodiment, the exhaust flow diverter directs the radial flow of the exhaust gas in a flow path characterized by a direction along the longitudinal axis of the plurality of heater tubes. Each opening in the plurality of openings may have the shape of a slot and have a width that increases in the direction of the flow path. In another embodiment, the exhaust flow diverter further includes a plurality of dividing structures inboard of the plurality of openings for spatially separating each heater tube in the plurality of heater tubes.

In accordance with another aspect of the invention, there is provided an improvement to an external combustion engine of the type having a piston undergoing reciprocating linear motion within an expansion cylinder containing a working fluid heated by conduction through a heater head by heat from exhaust gas from a combustion chamber. The improvement consists of a combustion chamber liner for directing the flow of the exhaust gas past a plurality of heater tubes of the heater head. The combustion chamber liner comprises a cylinder disposed between the combustion chamber and the inside of the plurality of heater tubes. The combustion chamber liner has a plurality of openings through which exhaust gas may pass. In one embodiment, the plurality of heater tubes includes inner heater tube sections proximal to the combustion chamber and outer heater tube sections distal to the combustion chamber. The plurality of openings directs the exhaust gas between the inner heater tube sections.

In accordance with another aspect of the present invention, there is provided an external combustion engine that includes a plurality of flow diverter fins thermally connected to a plurality of heater tubes of a heater head. Each flow diverter fin in the plurality of flow diverter fins direct the flow of an exhaust gas in a circumferential flow path around an adjacent heater tube. Each flow diverter fin is thermally connected to a heater tube along the entire length of the flow diverter fin. In one embodiment, each flow diverter fin has an L shaped cross section. In another embodiment, the flow diverter fins on adjacent heater tubes overlap one another.

In accordance with yet another aspect of the invention, there is provided a Stirling cycle engine of the type having a piston undergoing reciprocating linear motion within an expansion cylinder containing a working fluid heated by heat from an external source through a heater head. The Stirling cycle engine has a heat exchanger comprising a plurality of heater tubes in the form of helical coils that are coupled to the heater head. The plurality of helical coiled heater tubes transfer heat from the exhaust gas to the working fluid as the working fluid passes through the heater tubes. In addition, the helical coiled heater tubes are position on the heater head to form a combustion chamber. In one embodiment, each helical coiled heater tube has a helical coiled portion and a straight return portion that is placed on the outside of the helical coiled portion. Alternatively, each helical coiled heater tube has a helical coiled portion and a straight return portion that is placed inside of the helical coiled portion. In another embodiment, each helical coiled heater tube is a double helix. The straight return portion of each helical coiled heater tube may be aligned with a gap between the helical coiled heater tube and an adjacent helical coiled heater tube. In a further embodiment, the Stirling cycle engine includes a heater tube cap placed on top of the plurality of helical coiled heater tubes to prevent a flow of the exhaust gas out of the top of the plurality of helical coiled heater tubes.

BRIEF DESCRIPTION OF THE DRAWINGS

The invention will be more readily understood by reference to the following description taken with the accompanying drawings, in which.

DETAILED DESCRIPTION OF PREFERRED EMBODIMENTS

Figure 1:
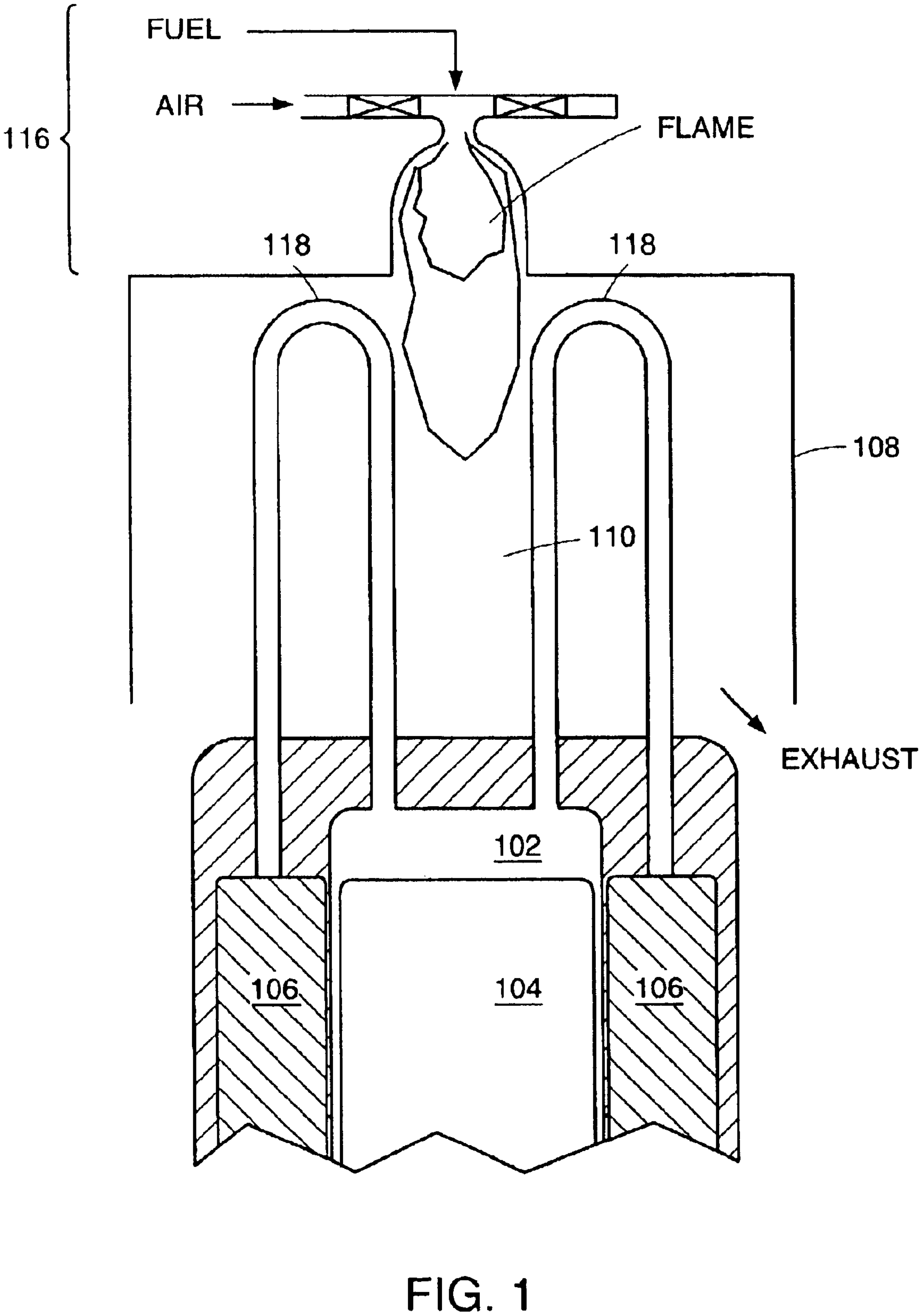
FIG. 1 PRIOR ART
FIG. 1 shows a tube heater head of an exemplary Stirling cycle engine.
Figure 2C:
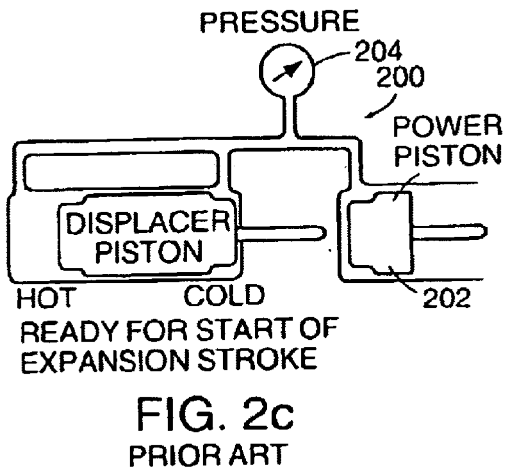
FIG. 2c PRIOR ART
FIGS. 2*a*–2*e* depict the principle of operation of a Stirling engine machine.
Figure 2D:
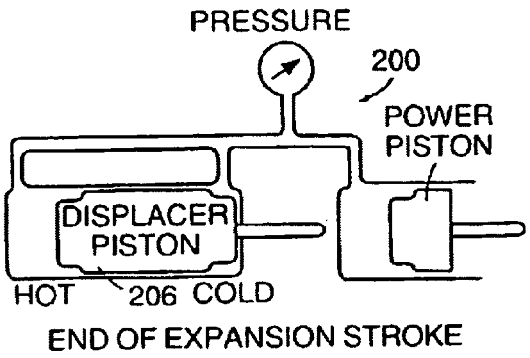
FIG. 2d PRIOR ART
Figure 2E:
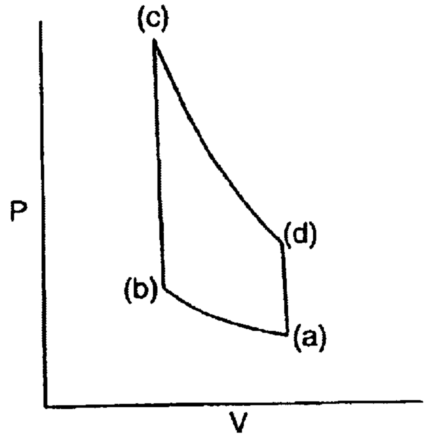
FIG. 2e PRIOR ART
Figure 2B:
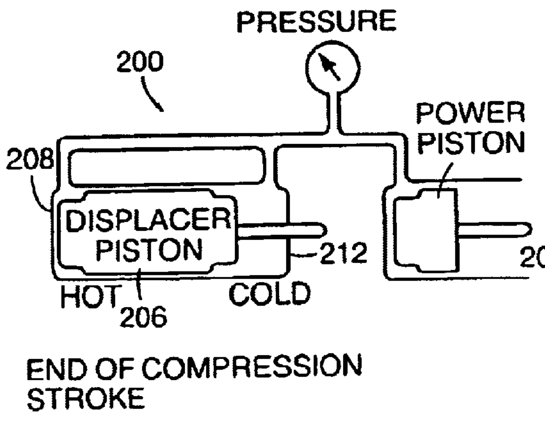
FIG. 2b PRIOR ART
Figure 2A:
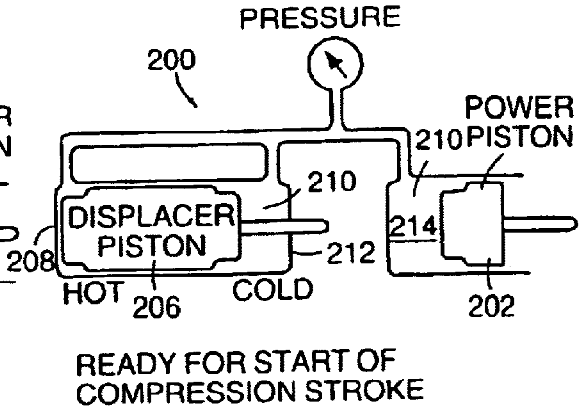
FIG. 2a PRIOR ART
Figure 3:
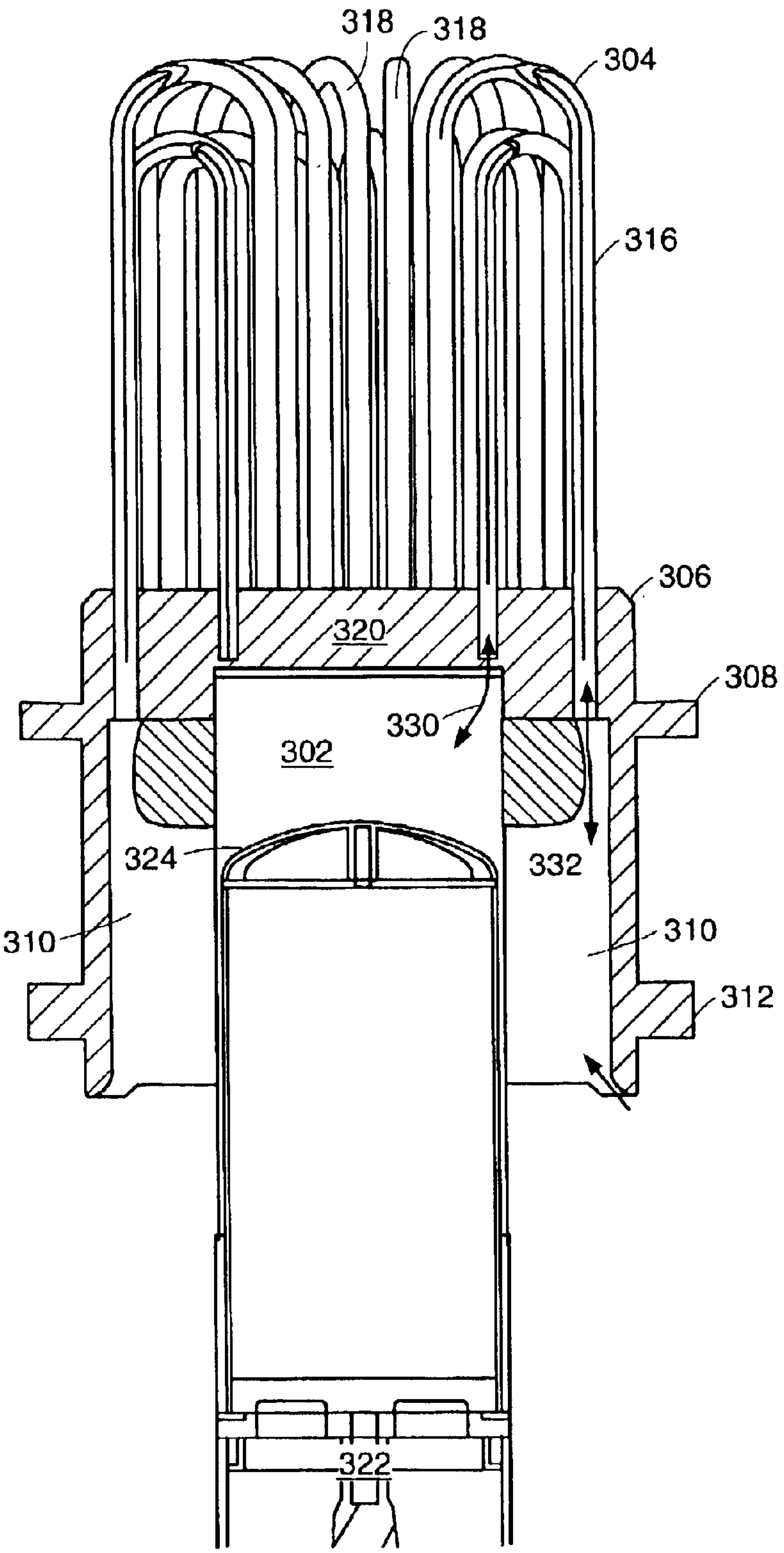
FIG. 3 PRIOR ART
FIG. 3 is a side view in cross-section of a tube heater head and expansion cylinder.

FIG. 3 is a side view in cross section of a tube heater head and an expansion cylinder. Heater head 306 is substantially a cylinder having one closed end 320 (otherwise referred to as the cylinder head) and an open end 322. Closed end 320 includes a plurality of U-shaped heater tubes 304 that are disposed in a burner 436 (shown in FIG. 4). Each U-shaped tube 304 has an outer portion 316 (otherwise referred to herein as an "outer heater tube") and an inner portion 318 (otherwise referred to herein as an "inner heater tube"). The heater tubes 304 connect the expansion cylinder 302 to regenerator 310. Expansion cylinder 302 is disposed inside heater head 306 and is also typically supported by the heater head 306. An expansion piston 324 travels along the interior of expansion cylinder 302. As the expansion piston 324 travels toward the closed end 320 of the heater head 306, working fluid within the expansion cylinder 302 is displaced and caused to flow through the heater tubes 304 and regenerator 310 as illustrated by arrows 330 and 332 in FIG. 3. A burner flange 308 provides an attachment surface for a burner 436 (shown in FIG. 4) and a cooler flange 312 provides an attachment surface for a cooler (not shown).

Figure 4:
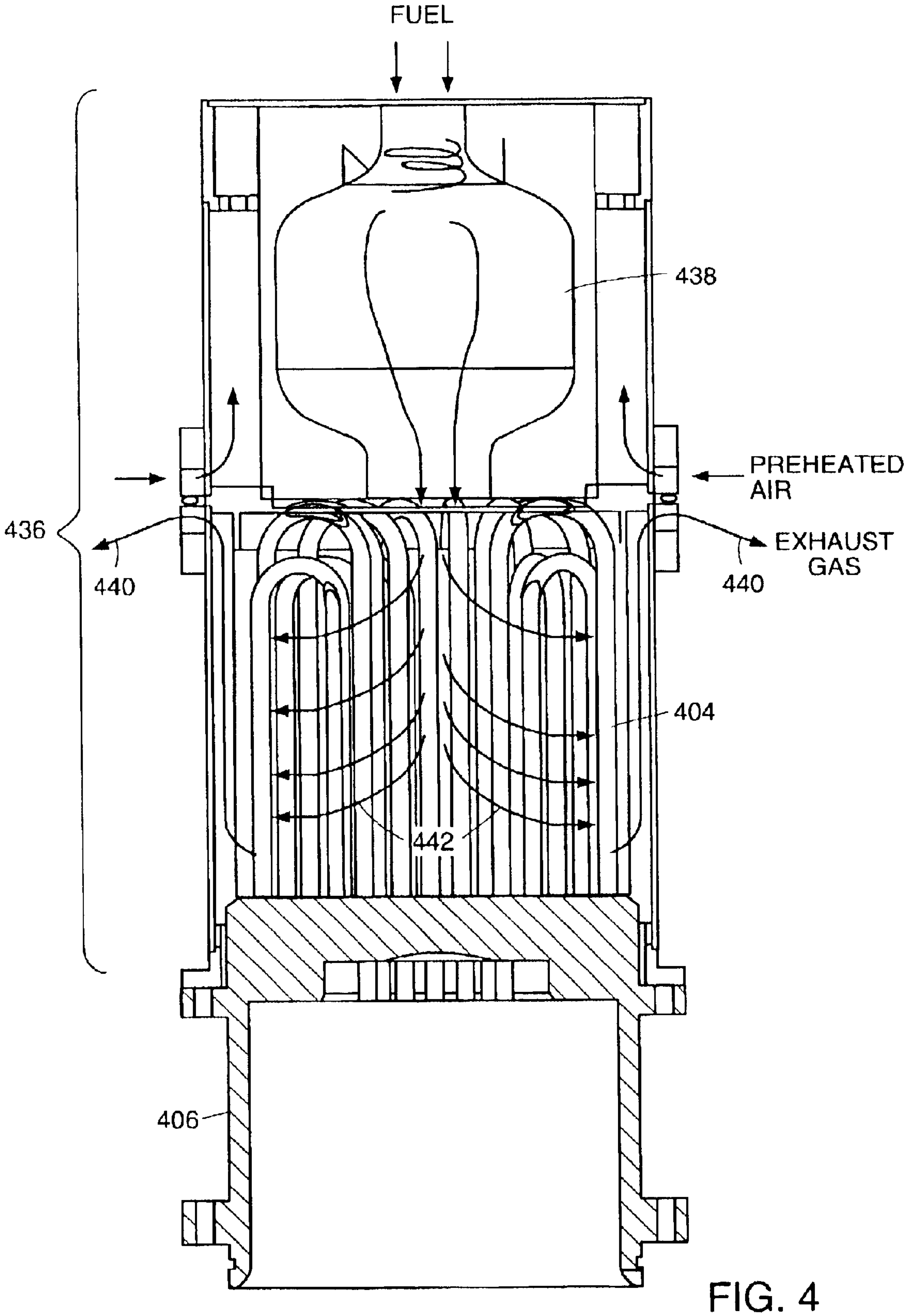
FIG. 4 PRIOR ART
FIG. 4 is a side view in cross-section of a tube heater head and burner showing the direction of air flow.

Referring to FIG. 4, as mentioned above, the closed end of heater head 406, including the heater tubes 404, is disposed in a burner 436 that includes a combustion chamber 438. Hot combustion gases (otherwise referred to herein as "exhaust gases") in combustion chamber 438 are in direct thermal contact with heater tubes 404 of heater head 406. Thermal energy is transferred by conduction from the exhaust gases to the heater tubes 404 and from the heater tubes 404 to the working fluid of the engine, typically helium. Other gases, such as nitrogen, for example, or mixtures of gases, may be used within the scope of the present invention, with a preferable working fluid having high thermal conductivity and low viscosity. Non-combustible gases are also preferred. Heat is transferred from the exhaust gases to the heater tubes 404 as the exhaust gases flow around the surfaces of the heater tubes 404. Arrows 442 show the general radial direction of flow of the exhaust gases. Arrows 440 show the direction of flow of the exhaust gas as it exits from the burner 436. The exhaust gases exiting from the burner 436 tend to overheat the upper part of the heater tubes 404 (near the U-bend) because the flow of the exhaust gases is greater near the upper part of the heater tubes than at the bottom of the heater tubes (i.e., near the bottom of the burner 436).

The overall efficiency of an external combustion engine is dependent in part on the efficiency of heat transfer between the combustion gases and the working fluid of the engine. Returning to FIG. 3, in general, the inner heater tubes 318 are warmer than the outer heater tubes 316 by several hundred degrees Celsius. The burner power and thus the amount of heating provided to the working fluid is therefore limited by the inner heater tube 318 temperatures. The maximum amount of heat will be transferred to the working gas if the inner and outer heater tubes are nearly the same temperature. Generally, embodiments of the invention, as described herein, either increase the heat transfer to the outer heater tubes or decrease the rate of heat transfer to the inner heater tubes.

Figure 5:
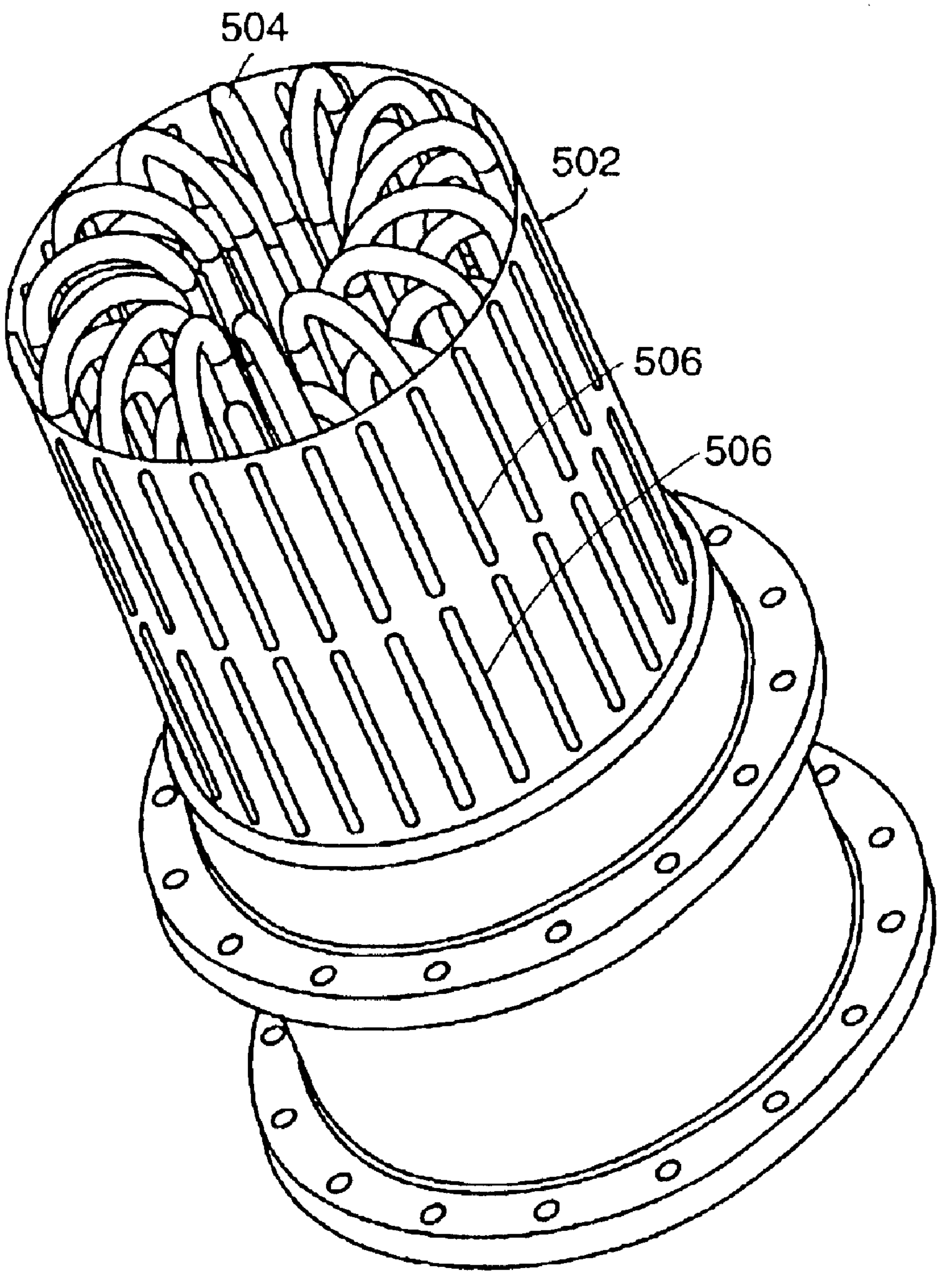
FIG. 5 is a perspective view of an exhaust flow concentrator and tube heater head in accordance with an embodiment of the invention.

FIG. 5 is a perspective view of an exhaust flow concentrator and a tube heater head in accordance with an embodiment of the invention. Heat transfer to a cylinder, such as a heater-tube, in cross-flow, is generally limited to only the upstream half of the tube. Heat transfer on the back side (or downstream half) of the tube, however, is nearly zero due to flow separation and recirculation. An exhaust flow concentrator 502 may be used to improve heat transfer from the exhaust gases to the downstream side of the outer heater tubes by directing the flow of hot exhaust gases around the downstream side (i.e. the back side) of the outer heater tubes. As shown in FIG. 5, exhaust flow concentrator 502 is a cylinder placed outside the bank of heater tubes 504. The exhaust flow concentrator 502 may be fabricated from heat resistant alloys, preferably high nickel alloys such as Inconel 600, Inconel 625, Stainless Steels 310 and 316 and more preferably Hastelloy X. Openings 506 in the exhaust flow concentrator 502 are lined up with the outer heater tubes. The openings 506 may be any number of shapes such as a slot, round hole, oval hole, square hole etc. In FIG. 5, the openings 506 are shown as slots. In a preferred embodiment, the slots 506 have a width approximately equal to the diameter of a heater tube 504. The exhaust flow concentrator 502 is preferably a distance from the outer heater tubes equivalent to one to two heater tube diameters.

Figure 6:
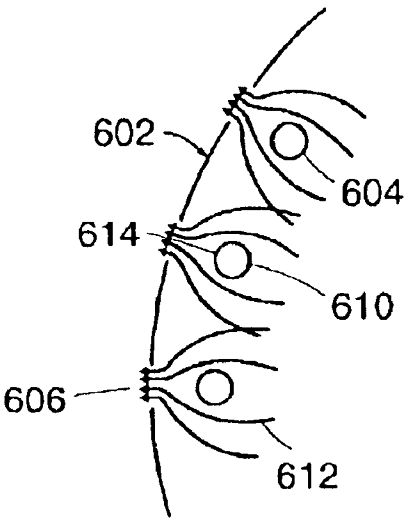
FIG. 6 illustrates the flow of exhaust gases using the exhaust flow concentrator of FIG. 5 in accordance with an embodiment of the invention.

FIG. 6 illustrates the flow of exhaust gases using the exhaust flow concentrator as shown in FIG. 5. As mentioned above, heat transfer is generally limited to the upstream side 610 of a heater tube 604. Using the exhaust flow concentrator 602, the exhaust gas flow is forced through openings 606 as shown by arrows 612. Accordingly, as shown in FIG. 6, the exhaust flow concentrator 602 increases the exhaust gas flow 612 past the downstream side 614 of the heater tubes 604. The increased exhaust gas flow past the downstream side 614 of the heater tubes 604 improves the heat transfer from the exhaust gases to the downstream side 614 of the heater tubes 604. This in turn increases the efficiency of heat transfer to the working fluid which can increase the overall efficiency and power of the engine.

Figure 7:
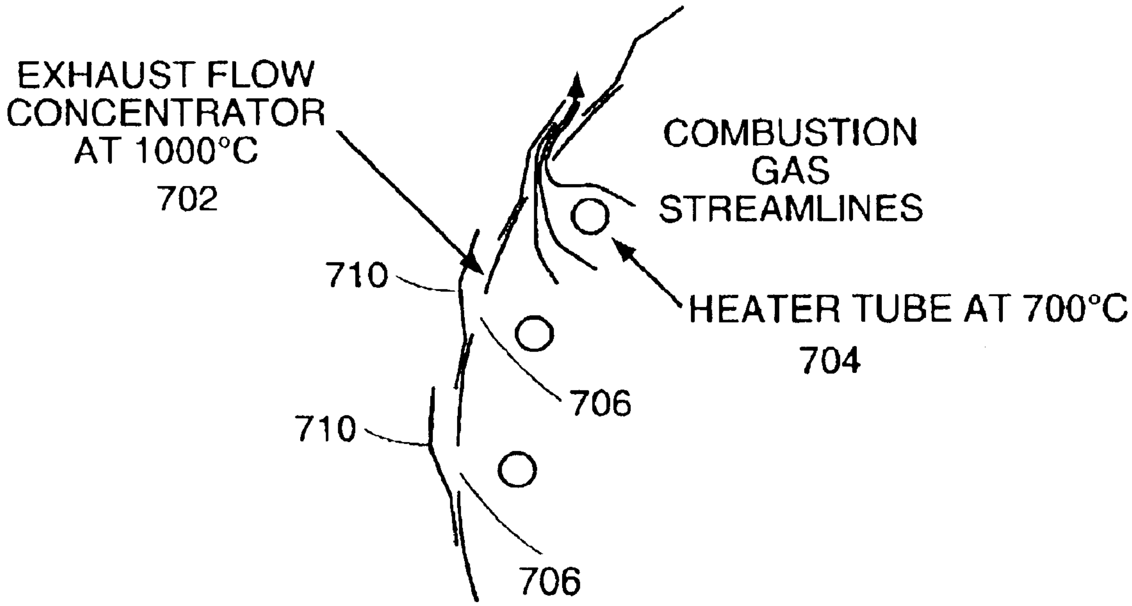
FIG. 7 shows an exhaust flow concentrator including heat transfer surfaces in accordance with an embodiment of the invention.

Returning to FIG. 5, the exhaust flow concentrator 502 may also improve the heat transfer to the downstream side of the heater tubes 504 by radiation. Referring to FIG. 7, given enough heat transfer between the exhaust gases and the exhaust flow concentrator, the temperature of the exhaust flow concentrator 702 will approach the temperature of the exhaust gases. In a preferred embodiment, the exhaust flow concentrator 702 does not carry any load and may therefore, operate at 1000° C. or higher. In contrast, the heater tubes 704 generally operate at 700° C. Due to the temperature difference, the exhaust flow concentrator 702 may then radiate thermally to the much cooler heater tubes 704 thereby increasing the heat transfer to the heater tubes 704 and the working fluid of the engine. Heat transfer surfaces (or fins) 710 may be added to the exhaust flow concentrator 702 to increase the amount of thermal energy captured by the exhaust flow concentrator 702 that may then be transferred to the heater tubes by radiation. Fins 710 are coupled to the exhaust flow concentrator 702 at positions outboard of and between the openings 706 so that the exhaust gas flow is directed along the exhaust flow concentrator, thereby reducing the radiant thermal energy lost through each opening in the exhaust flow concentrator. The fins 710 are preferably attached to the exhaust flow concentrator 702 through spot welding. Alternatively, the fins 710 may be welded or brazed to the exhaust flow concentrator 702. The fins 710 should be fabricated from the same material as the exhaust flow concentrator 702 to minimize differential thermal expansion and subsequent cracking. The fins 710 may be fabricated from heat resistant alloys, preferably high nickel alloys such as Inconel 600, Inconel 625, Stainless Steels 310 and 316 and more preferably Hastelloy X.

Figure 8:
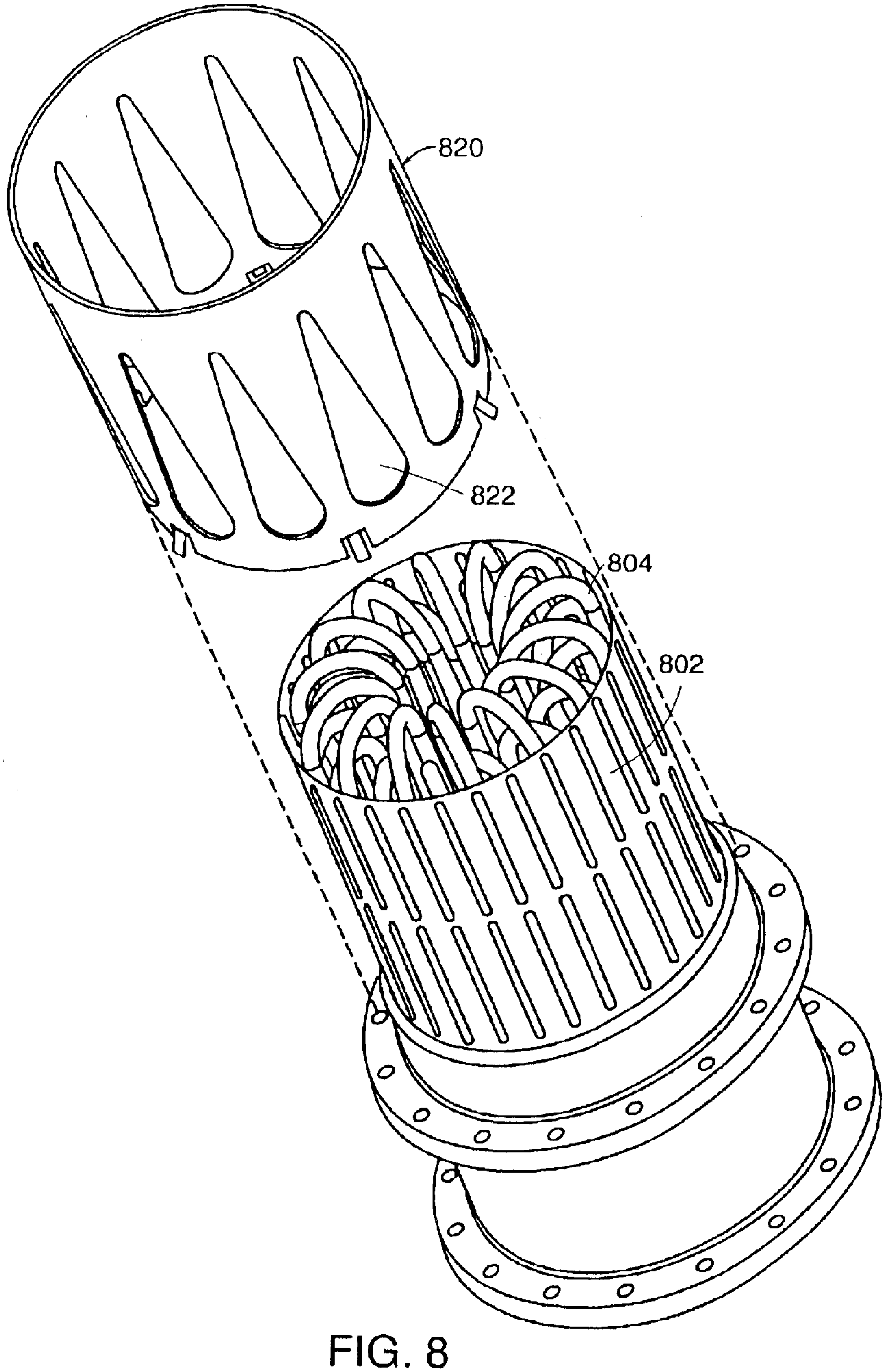
FIG. 8 is a perspective view an exhaust flow axial equalizer in accordance with an embodiment of the invention.

As mentioned above with respect to FIG. 4, the radial flow of the exhaust gases from the burner is greatest closest to the exit of the burner (i.e., the upper U-bend of the heater tubes). This is due in part to the swirl induced in the flow of the exhaust gases and the sudden expansion as the exhaust gases exit the burner. The high exhaust gas flow rates at the top of the heater tubes creates hot spots at the top of the heater tubes and reduces the exhaust gas flow and heat transfer to the lower sections of the heater tubes. Local overheating (hot spots) may result in failure of the heater tubes and thereby the failure of the engine. FIG. 8 is a perspective view of an exhaust flow axial equalizer in accordance with an embodiment of the invention. The exhaust flow axial equalizer 820 is used to improve the distribution of the exhaust gases along the longitudinal axis of the heater tubes 804 as the exhaust gases flow radially out of the tube heater head. (The typical radial flow of the exhaust gases is shown in FIG. 4.) As shown in FIG. 8, the exhaust flow axial equalizer 820 is a cylinder with openings 822. As mentioned above, the openings 822 may be any number of shapes such as a slot, round hole, oval hole, square hole etc. The exhaust flow axial equalizer 820 may be fabricated from heat resistant alloys, preferably high nickel alloys including Inconel 600, Inconel 625, Stainless Steels 310 and 316 and more preferably Hastelloy X.

In a preferred embodiment, the exhaust flow axial equalizer 820 is placed outside of the heater tubes 804 and an exhaust flow concentrator 802. Alternatively, the exhaust flow axial equalizer 820 may be used by itself (i.e., without an exhaust flow concentrator 802) and placed outside of the heater tubes 804 to improve the heat transfer from the exhaust gases to the heater tubes 804. The openings 822 of the exhaust flow axial equalizer 820 ,as shown in FIG. 8, are shaped so that they provide a larger opening at the bottom of the heater tubes 804. In other words, as shown in FIG. 8, the width of the openings 822 increases from top to bottom along the longitudinal axis of the heater tubes 804. The increased exhaust gas flow area through the openings 822 of the exhaust flow axial equalizer 820 near the lower portions of the heater tubes 804 counteracts the tendency of the exhaust gas flow to concentrate near the top of the heater tubes 804 and thereby equalizes the axial distribution of the radial exhaust gas flow along the longitudinal axis of the heater tubes 804.

Figure 9:
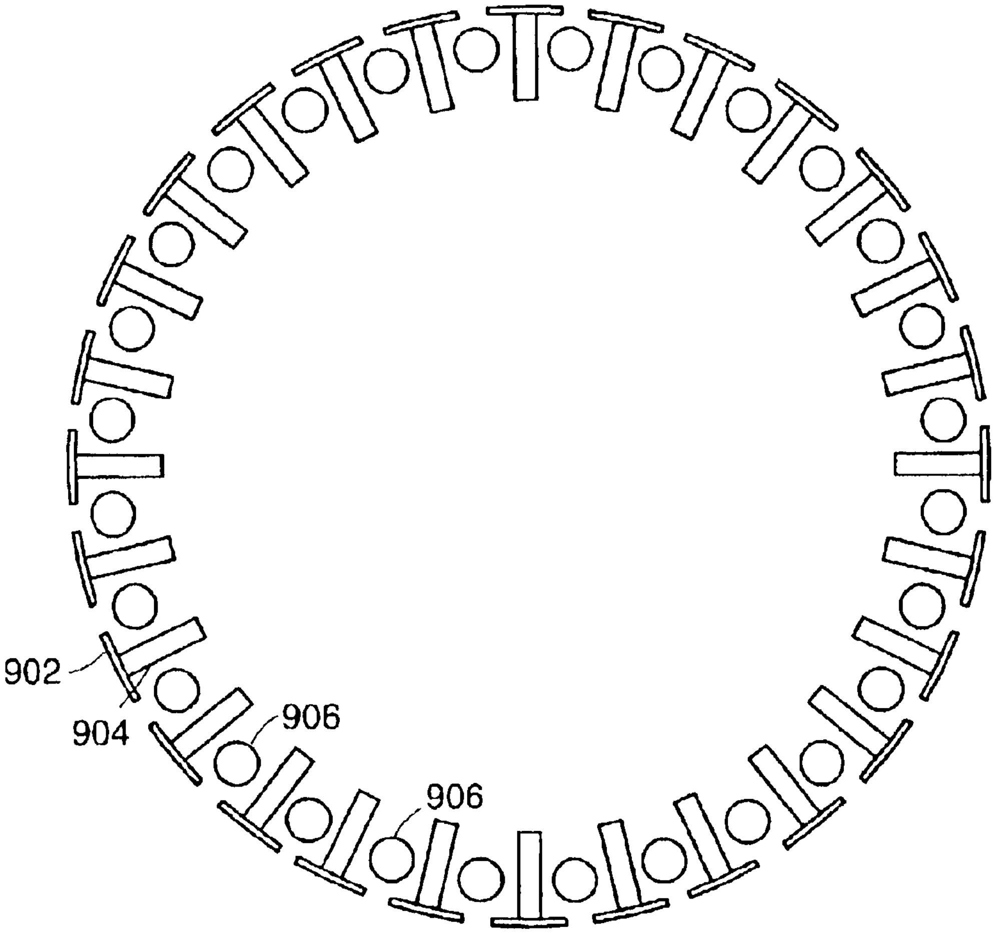
FIG. 9 shows an exhaust flow equalizer including spacing elements in accordance with an embodiment of the invention.

In another embodiment, as shown in FIG. 9, spacing elements 904 may be added to an exhaust flow concentrator 902 to reduce the spacing between the heater tubes 906. Alternatively, the spacing elements 904 could be added to an exhaust flow axial equalizer 820 (shown in FIG. 8) when it is used without the exhaust flow concentrator 904. As shown in FIG. 9, the spacing elements 904 are placed inboard of and between the openings. The spacers 904 create a narrow exhaust flow channel that forces the exhaust gas to increase its speed past the sides of heater tubes 906. The increased speed of the combustion gas thereby increases the heat transfer from the combustion gases to the heater tubes 906. In addition, the spacing elements may also improve the heat transfer to the heater tubes 906 by radiation.

Figure 10:
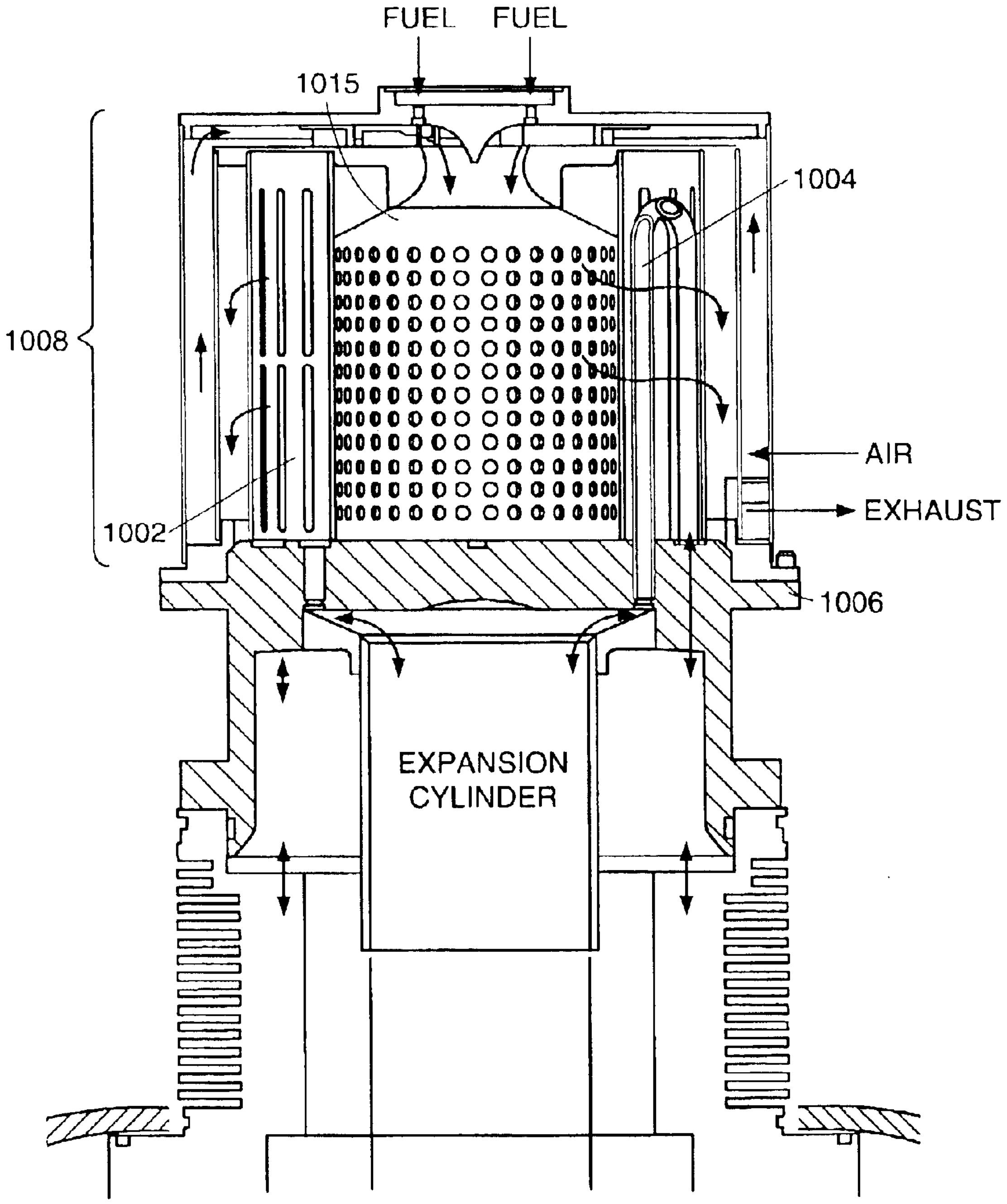
FIG. 10 is a cross-sectional side view of a tube heater head and burner in accordance with an alternative embodiment of the invention.

FIG. 10 is a cross-sectional side view of a tube heater head 1006 and burner 1008 in accordance with an alternative embodiment of the invention. In this embodiment, a combustion chamber of a burner 1008 is placed inside a set of heater tubes 1004 as opposed to above the set of heater tubes 1004 as shown in FIG. 4. A perforated combustion chamber liner 1015 is placed between the combustion chamber and the heater tubes 1004. Perforated combustion chamber liner 1015 protects the inner heater tubes from direct impingement by the flames in the combustion chamber. Like the exhaust flow axial equalizer 820, as described above with respect to FIG. 8, the perforated combustion chamber liner 1015 equalizes the radial exhaust gas flow along the longitudinal axis of the heater tubes 1004 so that the radial exhaust gas flow across the top of the heater tubes 1004 (near the U-bend) is roughly equivalent to the radial exhaust gas flow across the bottom of the heater tubes 1004. The openings in the perforated combustion chamber liner 1015 are arranged so that the combustion gases exiting the perforated combustion chamber liner 1015 pass between the inner heater tubes 1004. Diverting the combustion gases away from the upstream side of the inner heater tubes 1004 will reduce the inner heater tube temperature, which in turn allows for a higher burner power and a higher engine power. An exhaust flow concentrator 1002 may be placed outside of the heater tubes 1004. The exhaust flow concentrator 1002 is described above with respect to FIGS. 5 and 6.

Figure 11:
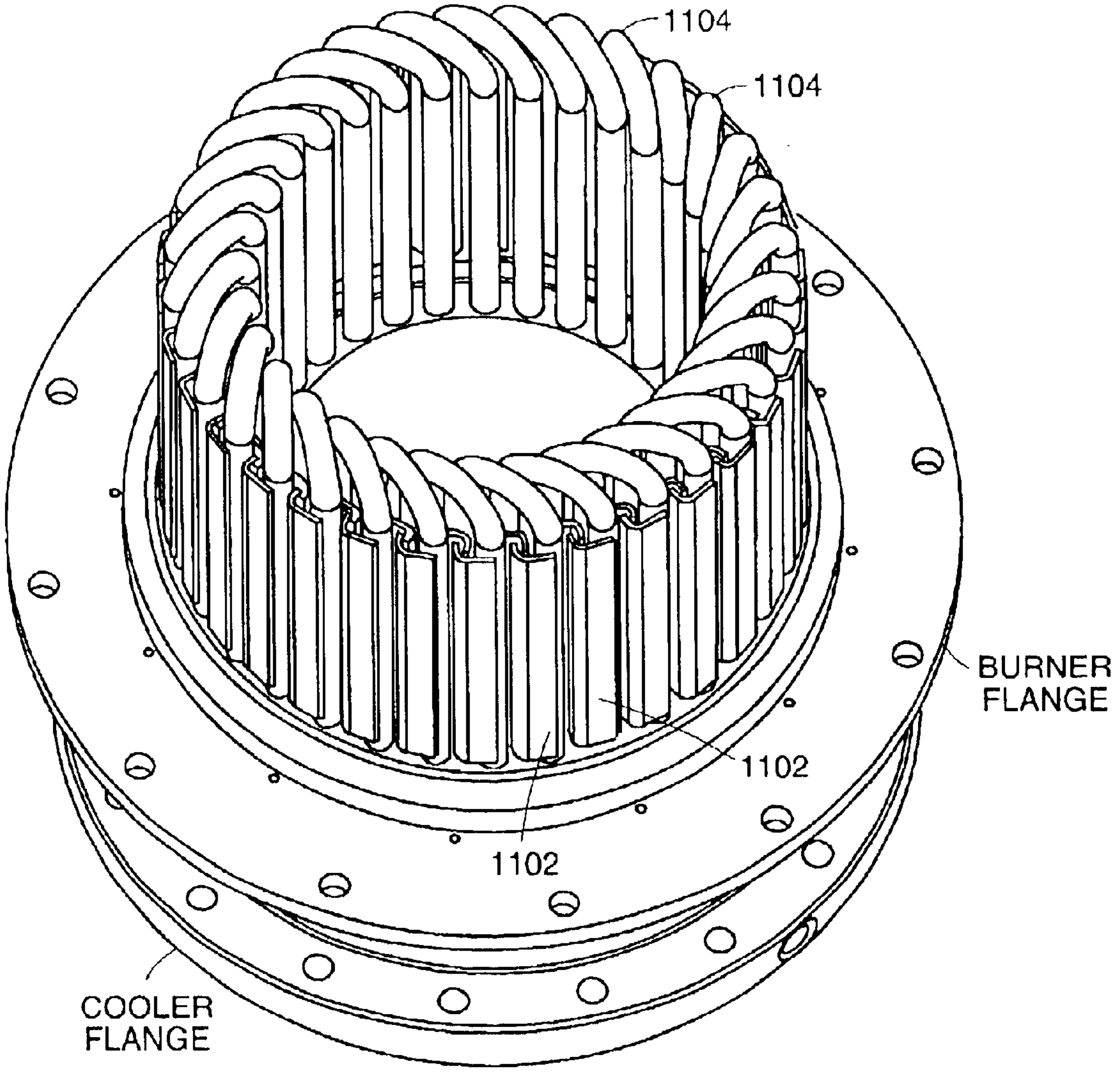
FIG. 11 is a perspective view of a tube heater head including flow diverter fins in accordance with an embodiment of the invention.

Another method for increasing the heat transfer from the combustion gas to the heater tubes of a tube heater head so as to transfer heat, in turn, to the working fluid of the engine is shown in FIG. 11. FIG. 11 is a perspective view of a tube heater head including flow diverter fins in accordance with an embodiment of the invention. Flow diverter fins 1102 are used to direct the exhaust gas flow around the heater tubes 1104, including the downstream side of the heater tubes 1104, in order to increase the heat transfer from the exhaust gas to the heater tubes 1104. Flow diverter fin 1102 is thermally connected to a heater tube 1104 along the entire length of the flow diverter fin. Therefore, in addition to directing the flow of the exhaust gas, flow diverter fins 1102 increase the surface area for the transfer of heat by conduction to the heater tubes 1104, and thence to the working fluid.

Figure 12:
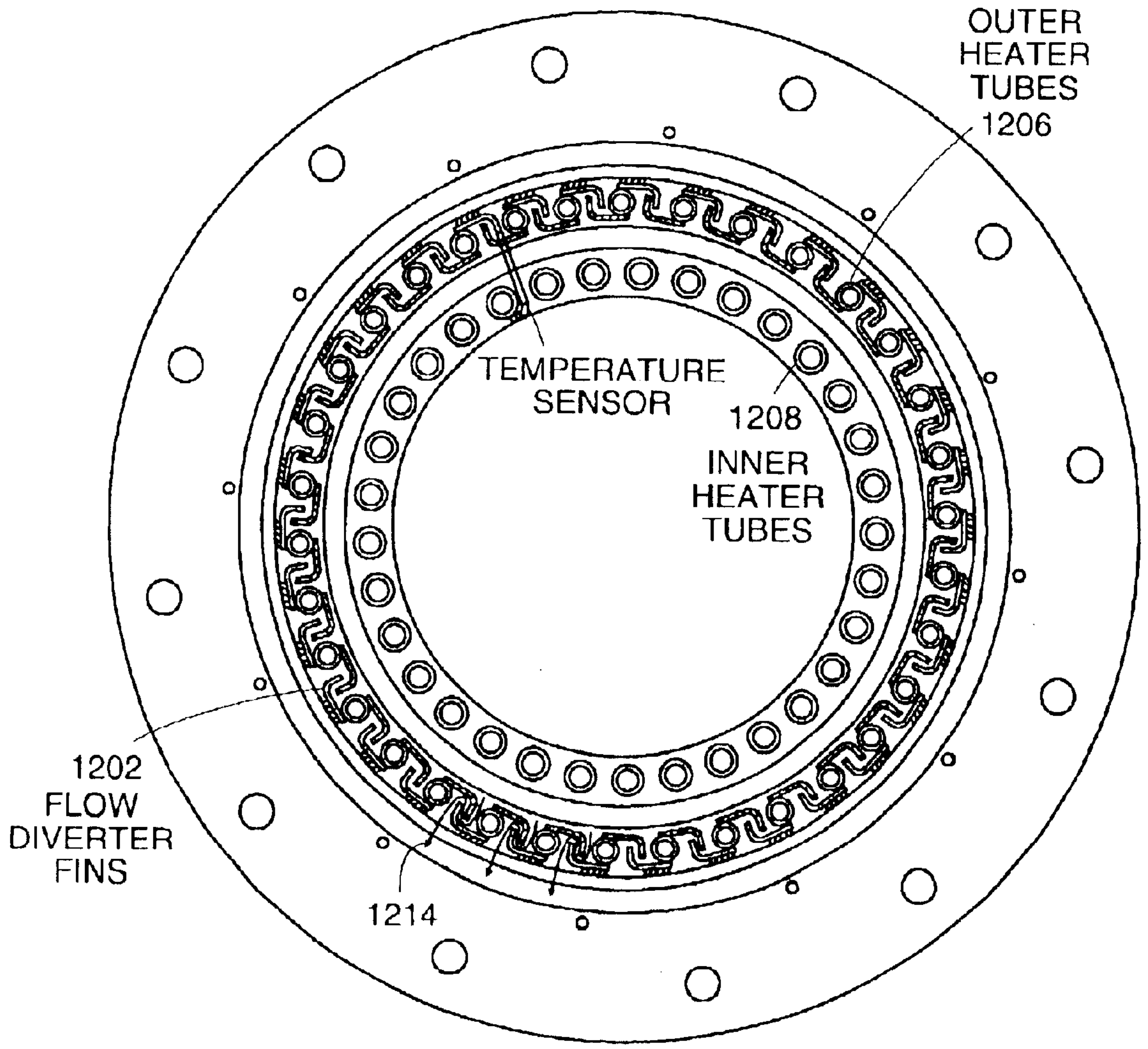
FIG. 12 is a top view in cross-section of the tube heater head including flow diverter fins in accordance with an embodiment of the invention.

FIG. 12 is a top view in cross-section of a tube heater head including flow diverter fins in accordance with an embodiment of the invention. Typically, the outer heater tubes 1206 have a large inter-tube spacing. Therefore, in a preferred embodiment as shown in FIG. 12, the flow diverter fins 1202 are used on the outer heater tubes 1206. In an alternative embodiment, the flow diverter fins could be placed on the inner heater tubes 1208. As shown in FIG. 12, a pair of flow diverter fins is connected to each outer heater tube 1206. One flow diverter fin is attached to the upstream side of the heater tube and one flow diverter fin is attached to the downstream side of the heater tube. In a preferred embodiment, the flow diverter fins 1202 are "L" shaped in cross section as shown in FIG. 12. Each flow diverter fin 1202 is brazed to an outer heater tube so that the inner (or upstream) flow diverter fin of one heater tube overlaps with the outer (or downstream) flow diverter fin of an adjacent heater tube to form a serpentine flow channel. The path of the exhaust gas flow caused by the flow diverter fins is shown by arrows 1214. The thickness of the flow diverter fins 1202 decreases the size of the exhaust gas flow channel thereby increasing the speed of the exhaust gas flow. This, in turn, results in improved heat transfer to the outer heater tubes 1206. As mentioned above, with respect to FIG. 11, the flow diverter fins 1202 also increase the surface area of the outer heater tubes 1206 for the transfer of heat by conduction to the outer heater tubes 1206.

Figure 13:
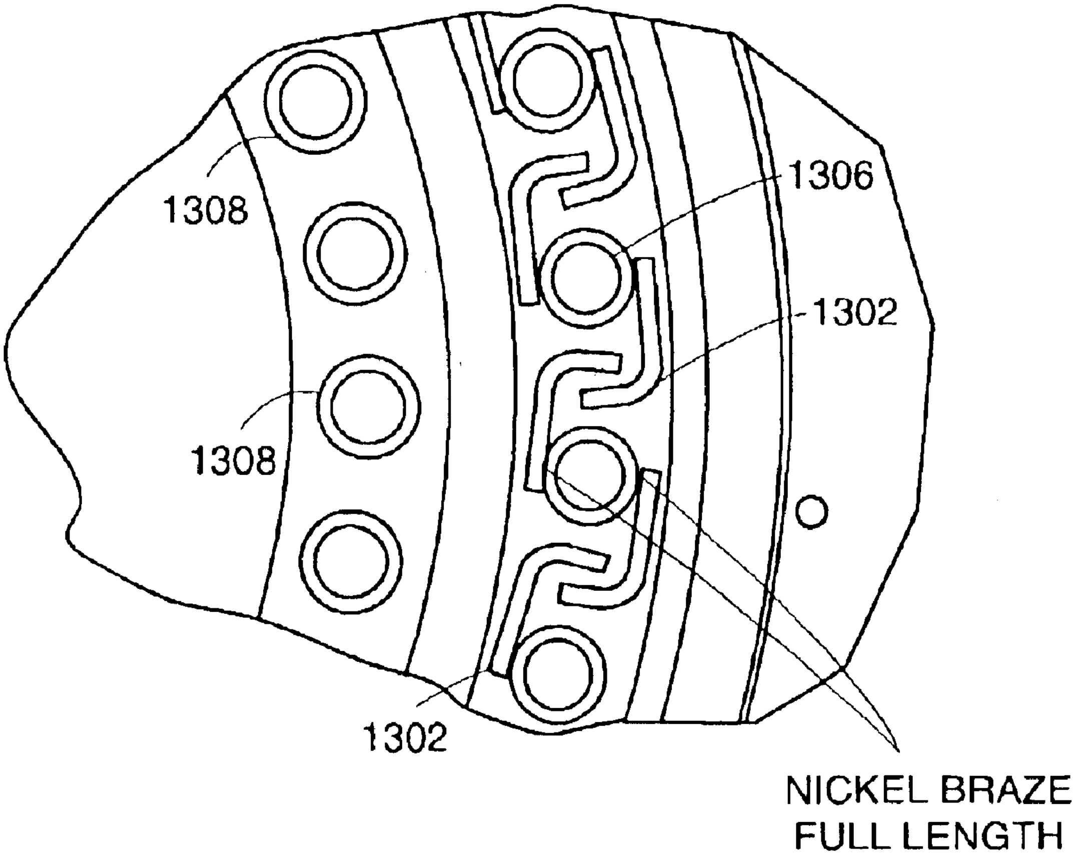
FIG. 13 is a cross-sectional top view of a section of the tube heater head of FIG. 11 in accordance with an embodiment of the invention.

FIG. 13 is a cross-sectional top view of a section of the tube heater head of FIG. 11 in accordance with an embodiment of the invention. As mentioned above, with respect to FIG. 12, a pair of flow diverter fins 1302 is brazed to each of the outer heater tubes 1306. In a preferred embodiment, the flow diverter fins 1302 are attached to an outer heater tube 1306 using a nickel braze along the full length of the heater tube. Alternatively, the flow diverter fins could be brazed with other high temperature materials, welded or joined using other techniques known in the art that provide a mechanical and thermal bond between the flow diverter fin and the heater tube.

Figure 14:
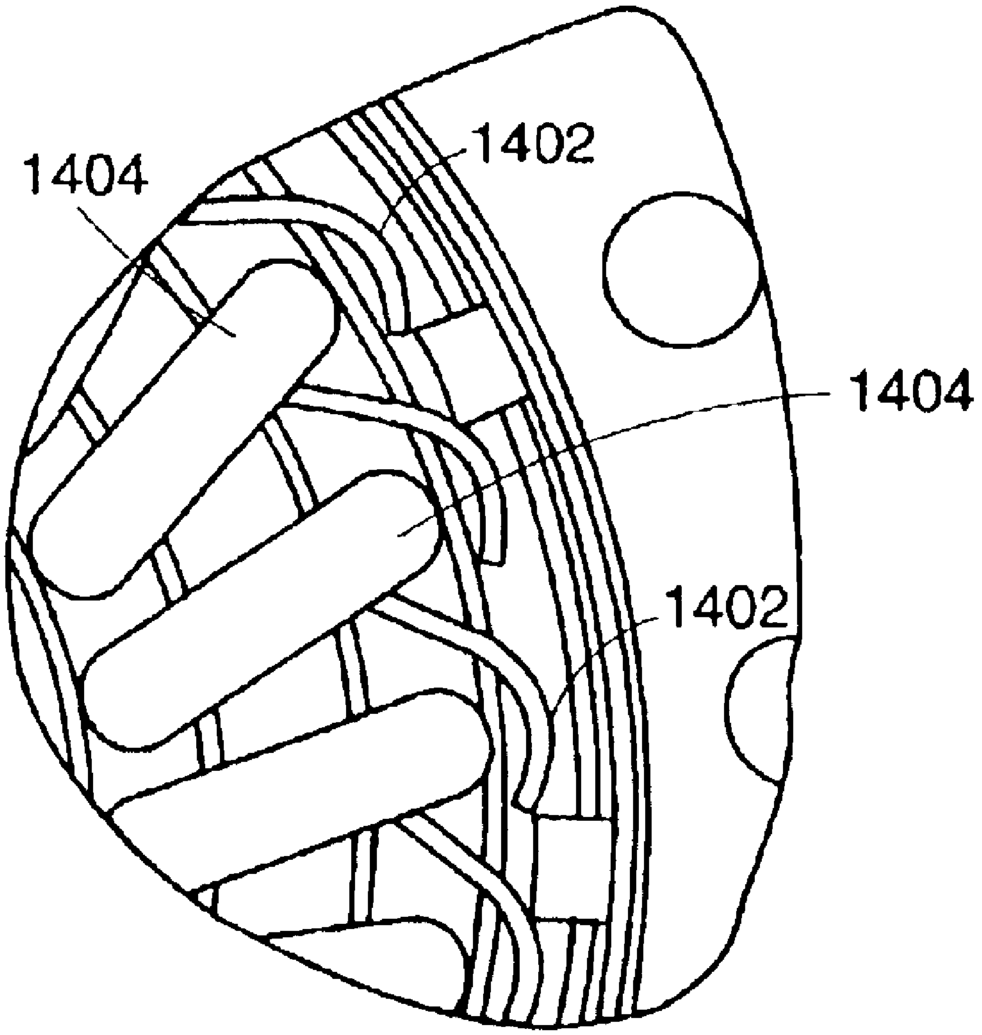
FIG. 14 is a top view of a section of a tube heater head with single flow diverter fins in accordance with an embodiment of the invention.

An alternative embodiment of flow diverter fins is shown in FIG. 14. FIG. 14 is a top view of a section of a tube heater head including single flow diverter fins in accordance with an embodiment of the invention. In this embodiment, a single flow diverter fin 1402 is connected to each outer heater tube 1404. In a preferred embodiment, the flow diverter fins 1402 are attached to an outer heater tube 1404 using a nickel braze along the full length of the heater tube. Alternatively, the flow diverter fins may be brazed with other high temperature materials, welded or joined using other techniques known in the art that provide a mechanical and thermal bond between the flow diverter fin and the heater tube. Flow diverter fins 1402 are used to direct the exhaust gas flow around the heater tubes 1404, including the downstream side of the heater tubes 1404. In order to increase the heat transfer from the exhaust gas to the heater tubes 1404, flow diverter fins 1402 are thermally connected to the heater tube 1404. Therefore, in addition to directing the flow of exhaust gas, flow diverter fins 1402 increase the surface area for the transfer of heat by conduction to the heater tubes 1404, and thence to the working fluid.

Figure 15:
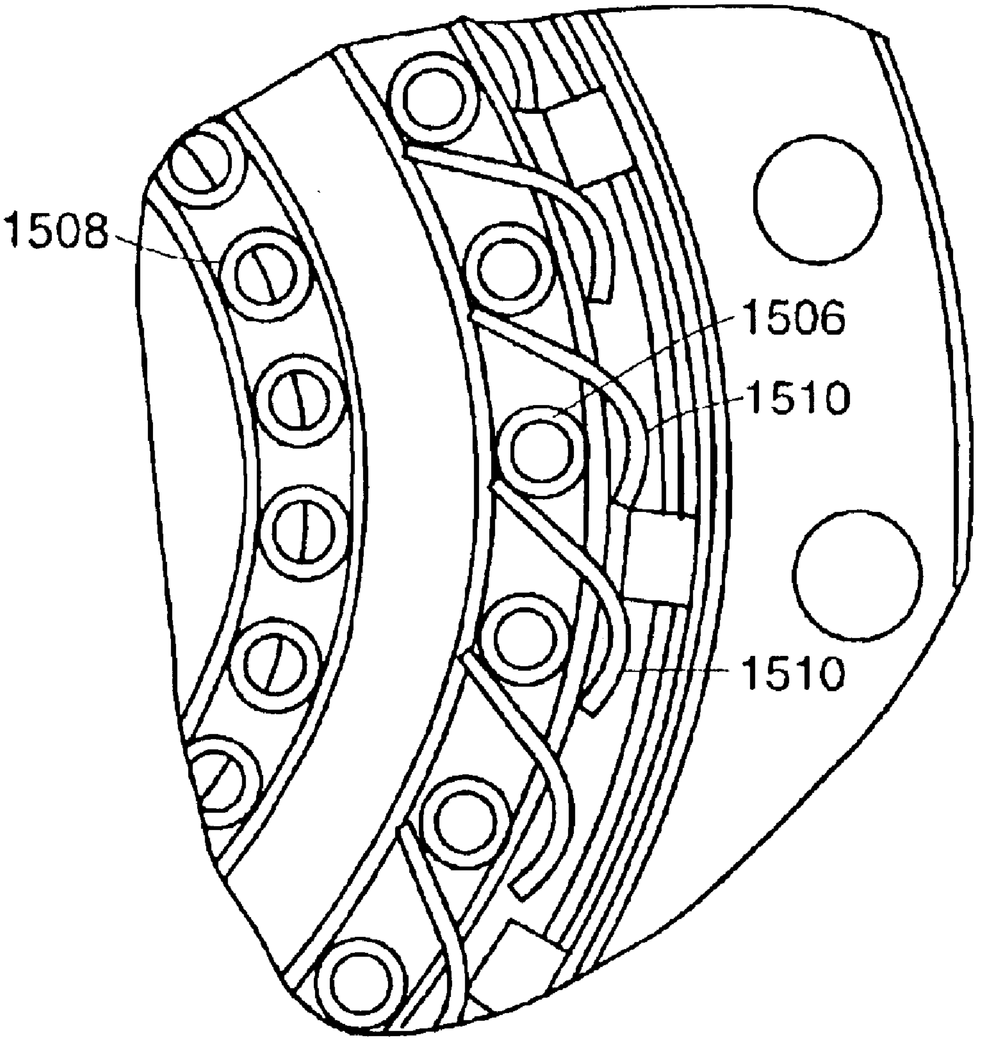
FIG. 15 is a cross-sectional top view of a section of a tube heater head with single flow diverter fins in accordance with an embodiment of the invention.

FIG. 15 is a top view in cross-section of a section of a tube heater head including the single flow diverter fins as shown in FIG. 14 in accordance with an embodiment of the invention. As shown in FIG. 15, a flow diverter fin 1510 is placed on the upstream side of a heater tube 1506. The diverter fin 1510 is shaped so as to maintain a constant distance from the downstream side of the heater tube 1506 and therefore improve the transfer of heat to the heater tube 1506. In an alternative embodiment, the flow diverter fins could be placed on the inner heater tubes 1508.

Engine performance, in terms of both power and efficiency, is highest at the highest possible temperature of the working gas in the expansion volume of the engine. The maximum working gas temperature, however, is typically limited by the properties of the heater head. For an external combustion engine with a tube heater head, the maximum temperature is limited by the metallurgical properties of the heater tubes. If the heater tubes become too hot, they may soften and fail resulting in engine shut down. Alternatively, at too high of a temperature the tubes will be severely oxidized and fail. It is, therefore, important to engine performance to control the temperature of the heater tubes. A temperature sensing device, such as a thermocouple, may be used to measure the temperature of the heater tubes.

Figure 16:
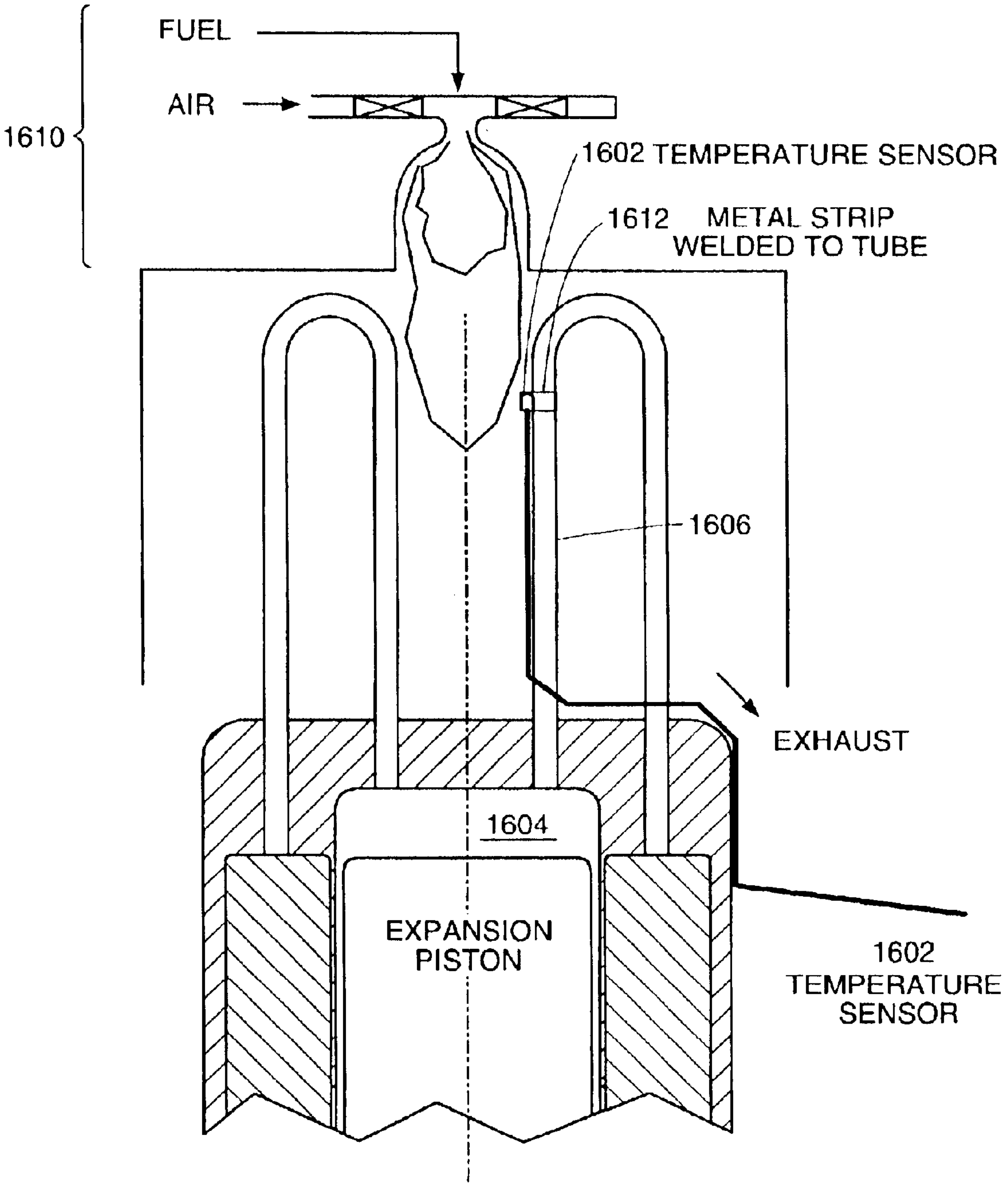
FIG. 16 is a side view in cross-section of an expansion cylinder and burner in accordance with an embodiment of the invention.

FIG. 16 is a side view in cross section of an expansion cylinder 1604 and a burner 1610 in accordance with an embodiment of the invention. A temperature sensor 1602 is used to monitor the temperature of the heater tubes and provide feedback to a fuel controller (not shown) of the engine in order to maintain the heater tubes at the desired temperature. In the preferred embodiment, the heater tubes are fabricated using Inconel 625 and the desired temperature is 930° C. The desired temperature will be different for other heater tube materials. The temperature sensor 1602 should be placed at the hottest, and therefore the limiting, part of the heater tubes. Generally, the hottest part of the heater tubes will be the upstream side of an inner heater tube 1606 near the top of the heater tube. FIG. 16 shows the placement of the temperature sensor 1602 on the upstream side of an inner heater tube 1606. In a preferred embodiment, as shown in FIG. 16, the temperature sensor 1602 is clamped to the heater tube with a strip of metal 1612 that is welded to the heater tube in order to provide good thermal contact between the temperature sensor 1602 and the heater tube 1606. In one embodiment, both the heater tubes 1606 and the metal strip 1612 may be Inconel 625 or other heat resistant alloys such as Inconel 600, Stainless Steels 310 and 316 and Hastelloy X. The temperature sensor 1602 should be in good thermal contact with the heater tube, otherwise it may read too high a temperature and the engine will not produce as much power as possible. In an alternative embodiment, the temperature sensor sheath may be welded directly to the heater tube.

In an alternative embodiment of the tube heater head, the U-shaped heater tubes may be replaced with several helical wound heater tubes. Typically, fewer helical shaped heater tubes are required to achieve similar heat transfer between the exhaust gases and the working fluid. Reducing the number of heater tubes reduces the material and fabrication costs of the heater head. In general, a helical heater tube does not require the additional fabrication steps of forming and attaching fins. In addition, a helical heater tube provides fewer joints that could fail, thus increasing the reliability of the heater head.

Figure 17A:
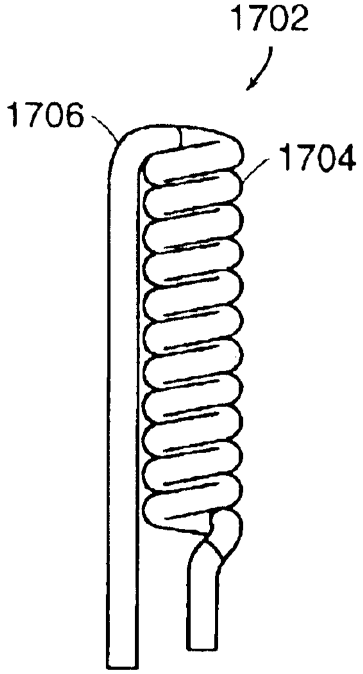
FIGS. 17*a*–17*d* are perspective views of a helical heater tube in accordance with a preferred embodiment of the invention.
Figure 17B:
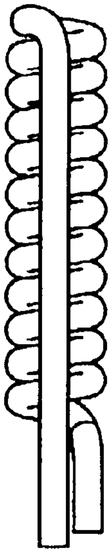
Figure 17C:
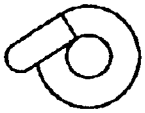
Figure 17D:
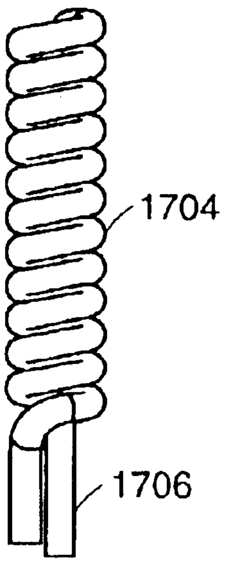
Figure 18:
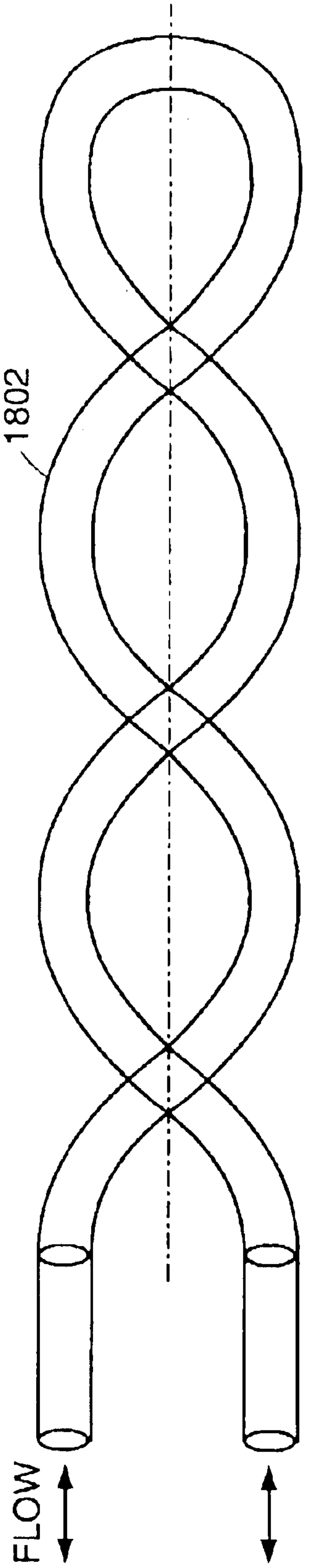
FIG. 18 shows a helical heater tube in accordance with an alternative embodiment of the invention.

FIGS. 17*a*–17*d* are perspective views of a helical heater tube in accordance with a preferred embodiment of the invention. The helical heater tube, 1702, as shown in FIG. 17*a*, may be formed from a single long piece of tubing by wrapping the tubing around a mandrel to form a tight helical coil 1704. The tube is then bent around at a right angle to create a straight return passage out of the helix 1706. The right angle may be formed before the final helical loop is formed so that the return can be clocked to the correct angle. FIGS. 17*b* and 17*c* show further views of the helical heater tube. FIG. 17*d* shows an alternative embodiment of the helical heater tube in which the straight return passage 1706 goes through the center of the helical coil 1704. FIG. 18 shows a helical heater tube in accordance with an alternative embodiment of the invention. In FIG. 18, the helical heater tube 1802 is shaped as a double helix. The heater tube 1802 may be formed using a U-shaped tube wound to form a double helix.

Figure 19:
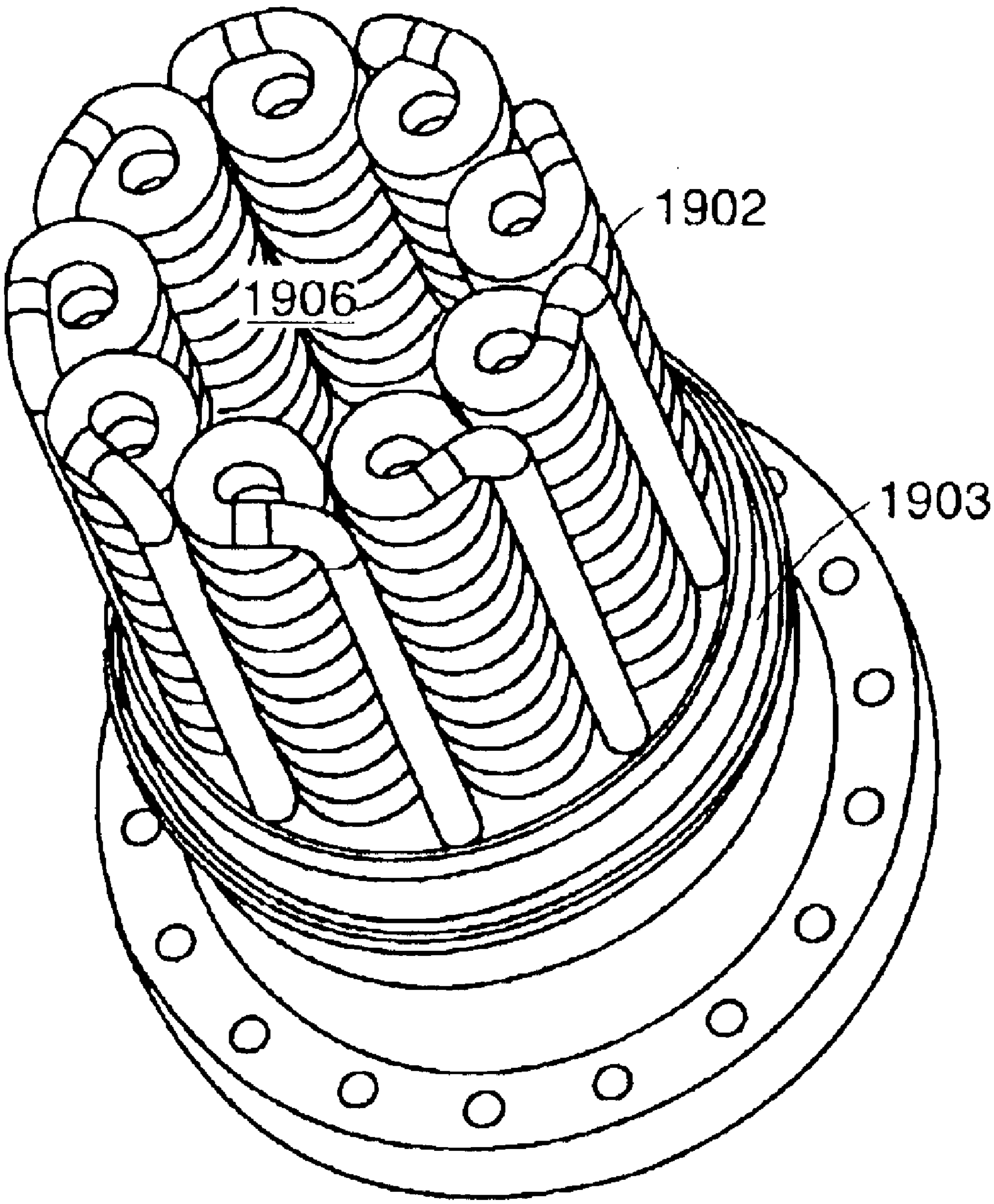
FIG. 19 is a perspective side view of a tube heater head with helical heater tubes (as shown in FIG. 17*a*) in accordance with an embodiment of the invention.

FIG. 19 is a perspective view of a tube heater head with helical heater tubes (as shown in FIG. 17*a*) in accordance with an embodiment of the invention. Helical heater tubes 1902 are mounted in a circular pattern o the top of a heater head 1903 to form a combustion chamber 1906 in the center of the helical heater tubes 1902. The helical heater tubes 1902 provide a significant amount of heat exchange surface around the outside of the combustion chamber 1906.

Figure 20:
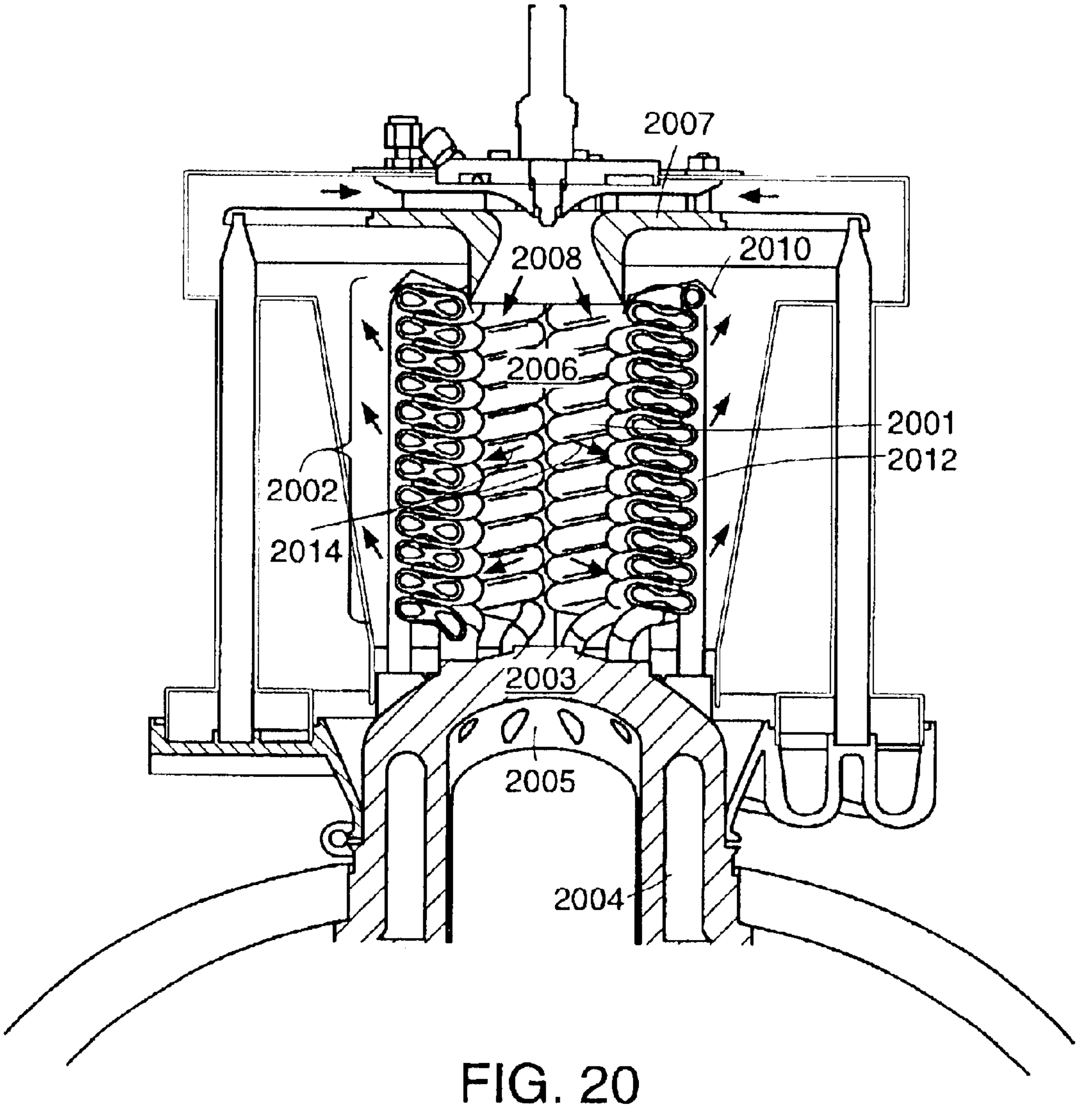
FIG. 20 is a cross-sectional view of a tube heater head with helical heater tubes and a burner in accordance with an embodiment of the invention.

FIG. 20 is a cross sectional view of a burner and a tube heater head with helical heater tubes in accordance with an embodiment of the invention. Helical heater tubes 2002 connect the hot end of a regenerator 2004 to an expansion cylinder 2005. The helical heater tubes 2002 are arranged to form a combustion chamber 2006 for a burner 2007 that is mounted coaxially and above the helical heater tubes 2002. Fuel and air are mixed in a throat 2008 of the burner 2007 and combusted in the combustion chamber 2006. the hot combustion (or exhaust) gases flow, as shown by arrows 2014, across the helical heater tubes 2002, providing heat to the working fluid as it passes through the helical heater tubes 2002.

In one embodiment, the heater head 2003 further includes a heater tube cap 2010 at the top of each helical coiled heater tubes 2002 to prevent the exhaust gas from entering the helical coil portion 2001 of each heater tube and exiting out the top of the coil. In another embodiment, an annular shaped piece of metal covers the top of all of the helical coiled heater tubes. The heater tube cap 2010 prevents the flow of the exhaust gas along the heater head axis to the top of the helical heater tubes between the helical heater tubes. In one embodiment, the heater tube cap 2010 may be Inconel 625 or other heat resistant alloys such as Inconel 600, Stainless Steels 310 and 316 and Hastelloy X.

In another embodiment, the top of the heater head 2003 under the helical heater tubes 2002 is covered with a moldable ceramic paste. The ceramic paste insulates the heater head 2003 from impingement heating by the flames in the combustion chamber 2006 as well as from the exhaust gases. In addition, the ceramic blocks the flow of the exhaust gases along the heater head axis to the bottom of the helical heater tubes 2002 either between the helical heater tubes 2002 or inside the helical coil portion 2001 of each heater tube.

Figure 21:
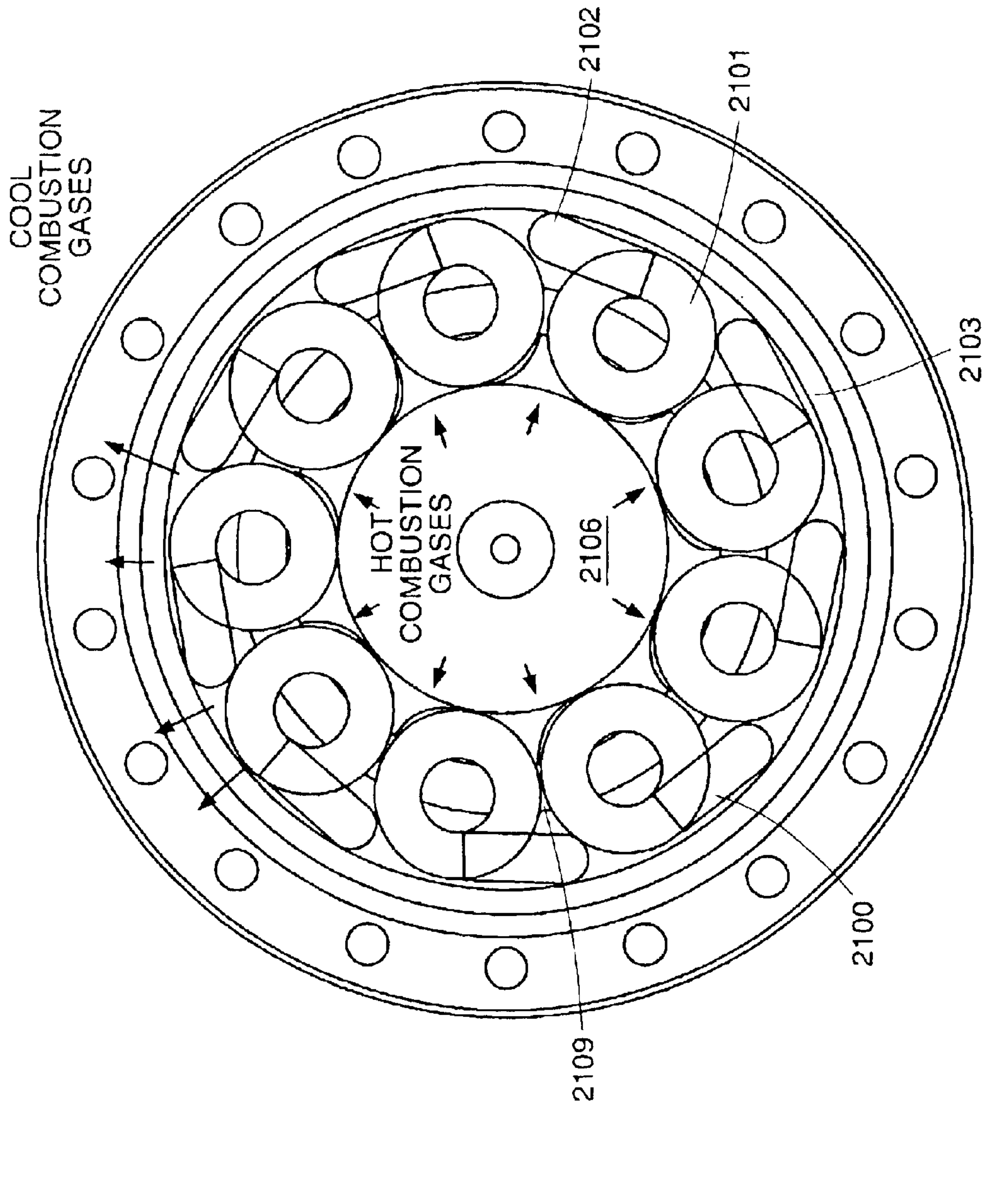
FIG. 21 is a top view of a tube heater head with helical heater tubes in accordance with an embodiment of the invention.

FIG. 21 is a top view of a tube heater head with helical heater tubes in accordance with an embodiment of the invention. As shown in FIG. 21, the return or straight section 2102 of each helical heater tube 2100 is advantageously placed outboard of gap 2109 between adjacent helical heater tubes 2100. It is important to balance the flow of exhaust gases through the helical heater tubes 2100 with the flow of exhaust gases through the gaps 2109 between the helical heater tubes 2100. By placing the straight portion 2102 of the helical heater tube outboard of the gap 2109, the pressure drop for exhaust gas passing through the helical heater tubes is increased, thereby forcing more of the exhaust gas through the helical coils where the heat transfer and heat exchange area are high. Exhaust gas that does not pass between the helical heater tubes will impinge on the straight section 2102 of the helical heater tube, providing high heat transfer between the exhaust gases and the straight section. Both FIGS. 20 and 21 show the helical heater tubes placed as close together as possible to minimize the flow of exhaust gas between the helical heater tubes and thus maximize heat transfer. In one embodiment, the helical coiled heater tubes 2001 may be arranged so that the coils nest together.

The devices and methods herein may be applied in other heat transfer applications besides the Stirling engine in terms of which the invention has been described. The described embodiments of the invention are intended to be merely exemplary and numerous variations and modifications will be apparent to those skilled in the art. All such variations and modifications are intended to be within the scope of the present invention as defined in the appended claims.

We claim:

1. In an external combustion engine of the type having a piston undergoing reciprocating linear motion within an expansion cylinder containing a working fluid heated by conduction through a heater head, having a plurality of heater tubes, of heat from exhaust gas from an external combustor having a fuel supply, the improvement comprising:

a temperature sensor for measuring the temperature of at least one heater tube in the plurality of heater tubes, the temperature sensor thermally coupled to at least one heater tube at a point of maximum temperature of the heater tube.

2. An external combustion engine according to claim 1, wherein the temperature sensor is a thermocouple.

3. An external combustion engine according to claim 1, wherein the point of maximum temperature is an upstream side of the at least one heater tube.

4. An external combustion engine according to claim 1, wherein the temperature sensor is thermally coupled to the at least one heater tube using a metal band.

5. In a Stirling cycle engine of the type having a piston undergoing reciprocating linear motion within an expansion cylinder containing a working fluid heated by conduction through a heater head by heat from an exhaust gas from an external thermal source,the improvement comprising:

a heat exchanger comprising a plurality of helical coiled heater tubes coupled to the heater head, the plurality of helical coiled heater tubes for transferring heat from the exhaust gas to the working fluid as the working fluid passes through the heater tubes, where the plurality of helical coiled heater tubes are positioned on the heater head to form a combustion chamber.

6. A Stirling cycle engine according to claim 5, wherein each helical coiled heater tube has a helical coiled portion and a straight return portion, the straight return portion placed on the outside of the helical coiled portion.

7. A Stirling cycle engine according to claim 5, wherein each helical coiled heater tube has a helical coiled portion and a straight return portion, the straight return portion placed inside of the helical coiled portion.

8. A Stirling cycle engine according to claim 5, wherein each helical coiled heater tube is shaped as a double helix.

9. A Stirling cycle engine according to claim 5, wherein the straight return portion of each helical coiled heater tube is aligned with a gap between the helical coiled heater tube and an adjacent helical coiled heater tube.

10. A Stirling cycle engine according to claim 5, further including a heater tube cap placed on a top of the plurality of helical coiled heater tubes, the heater head cap for preventing a flow of the exhaust gas out of the top of the plurality of helical coiled heater tubes.

* * * * *